Nov. 9, 1954
F. R. McFARLAND
2,693,810
SPEED RESPONSIVE CONTROL MEANS
Filed July 8, 1950
2 Sheets-Sheet 1
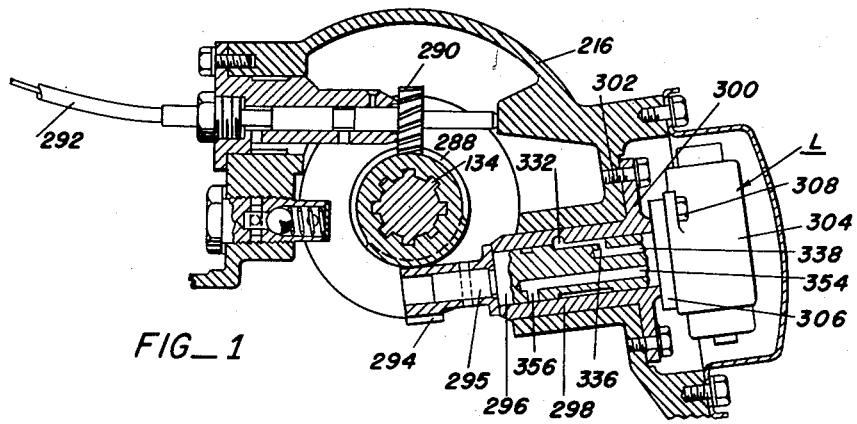
FIG_1
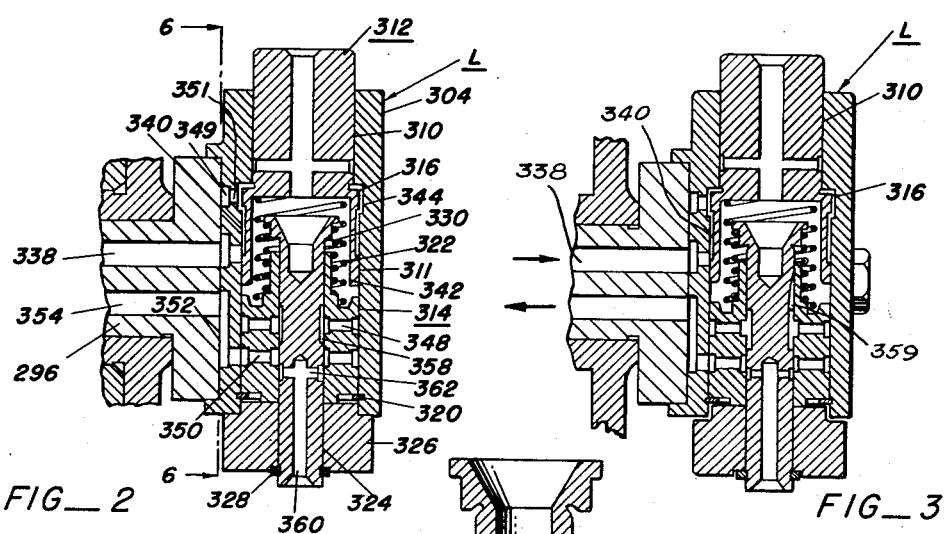
FIG_2  FIG_3
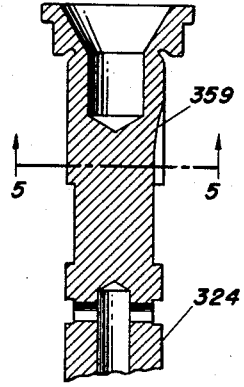
FIG_4  FIG_5
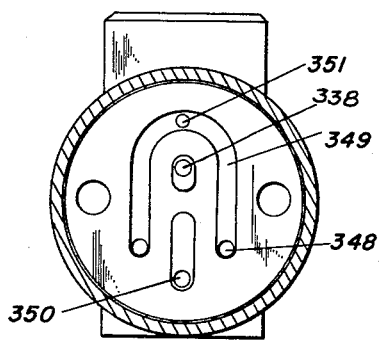
FIG_6
Inventor
FOREST R. McFARLAND
By Davis, Lindsey, Hibben & Noyes
Attorneys Nov. 9, 1954
F. R. McFARLAND
2,693,810
SPEED RESPONSIVE CONTROL MEANS
Filed July 8, 1950
2 Sheets-Sheet 2
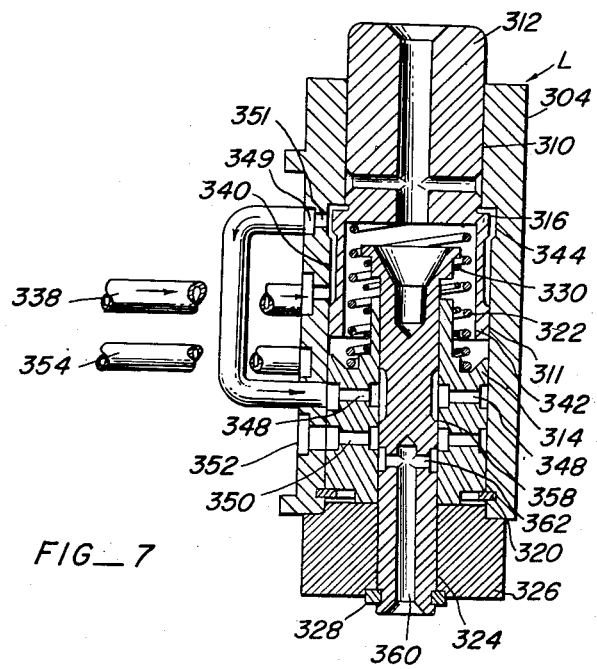
FIG_7
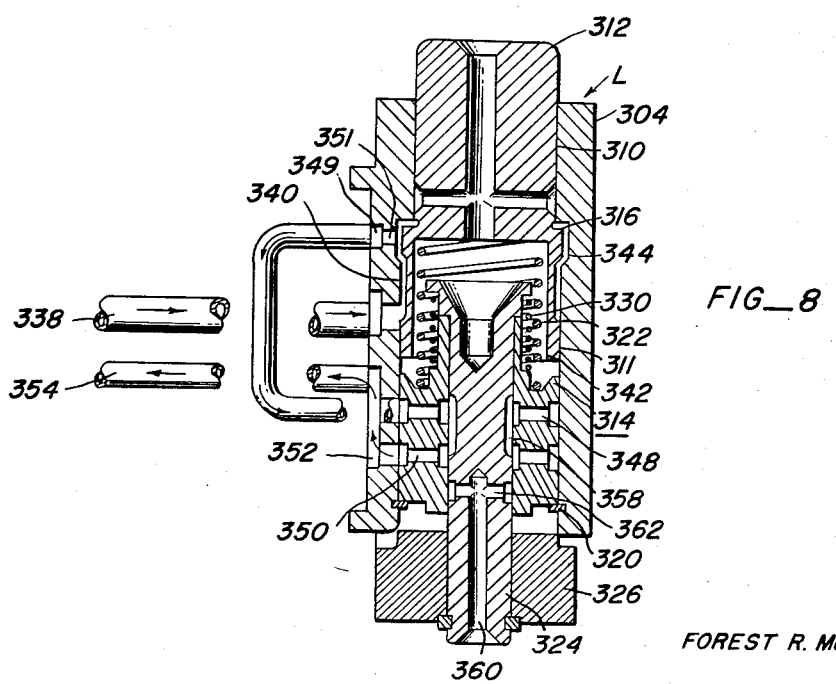
FIG_8
INVENTOR
FOREST R. McFARLAND
By Wilson, Pedrow and Gaines
ATTORNEYS

United States Patent Office 2,693,810
Patented Nov. 9, 1954

2,693,810

SPEED RESPONSIVE CONTROL MEANS

Forest R. McFarland, Huntington Woods, Mich., assignor to Packard Motor Car Company, Detroit, Mich., a corporation of Michigan Application July 8, 1950, Serial No. 172,659

11 Claims. (Cl. 137—51)

This invention relates to pressure regulators or reducers and particularly to rotatable regulators which produce a pressure varying as a function of the speed of rotation of the regulator. Such regulators are particularly useful in automatic transmissions for automotive vehicles and when so used function as governors to control the operation of a clutch or brake.

An automatic transmission, utilizing a rotatable pressure regulator, is disclosed in my co-pending application, Serial No. 71,128, filed January 15, 1949, of which this application is a continuation-in-part. In the said co-pending application there is disclosed a hydraulic torque converter which operates to start a vehicle from a standing start and accelerates the vehicle to a given road speed, at which time a friction clutch is made to operate to bypass the torque converter and provide a purely mechanical path for the transmission of power. The clutch there disclosed is operated by an annular piston which in turn is operated by fluid under pressure.

The time and circumstances under which a shift from torque converter drive to clutch drive are preferably varied with the wishes of the driver and the capabilities of the engine at the time of the shift. Thus, if the driver wishes to continue accelerating beyond the speed at which a shift would normally occur, means must be provided to delay the shift to secure the desired operation. If the clutch is to be shifted at a high vehicle speed, a shift can be effected rather abruptly but, if the clutch is to be shifted at a low vehicle speed, the rate of engagement must be slower.

The principal object of this invention is to provide a speed driven fluid pressure regulator adapted to perform the functions of a governor in a hydraulic transmission, said regulator being relatively light in weight and yet being adapted to operate over a relatively large range of speeds. A further feature of this invention is the provision of a speed responsive valve in a governor assembly to provide fluid pressure immediately upon the attainment of a predetermined speed, and which interrupts the supply of fluid pressure upon decelerating to a speed slightly under the initial supply speed.

Inasmuch as the fluid pressures normally handled by a pressure regulator may be quite large, it is considered desirable to exercise care in making the valves forming a part of the regulator balanced so as to minimize or eliminate entirely lateral thrusts on the valves. Thus, it has been considered desirable to reduce the forces acting on a pressure regulator valve to axial forces and to eliminate all side thrust in order that the axial forces may operate freely. It has been found, however, that it is possible, particularly where the fluid regulated is a lubricant such as a transmission oil, that the operation of the pressure regulator valve may be too free and may result in hunting. In the case of a clutch controlled by such valve, hunting will result in clutch chatter.

Another object of this invention, therefore, is to provide a pressure regulator, wherein hunting is substantially eliminated.

A more specific object of this invention is to provide a pressure regulator in which an unbalanced condition is deliberately produced, in order to create enough friction in the movement of the valve to dampen any tendencies the valve may have to flutter or hunt.

Yet another object of this invention is to provide a pressure regulating valve, the regulated output pressure of which varies as a function comprising a constant plus the square of the speed of rotation of the valve.

These and other objects and features of this invention will become apparent from the following detailed description when taken together with the accompanying drawings, in which Fig. 1 is a fragmentary section through a transmission such as the one disclosed in my co-pending application, Serial No. 71,128, showing a drive shaft, and a pressure regulating valve driven by the shaft and functioning as a governor;

Fig. 2 is an enlarged section through the pressure regulating valve disclosed in Fig. 1;

Fig. 3 is a section through a pressure regulating valve similar to the valve shown in Fig. 2, but incorporating an unbalanced feature to eliminate hunting;

Fig. 4 is an enlarged section through the movable portion of the valve of Fig. 3;

Fig. 5 is a section through the movable portion of Fig. 4 taken along line 5—5 thereof;

Fig. 6 is a view of the regulating valve along line 6—6 of Fig. 2; and

Figure 7 is a schematic view showing the fluid flow through the governor control means wherein regulated pressure is fed through the regulating valve but is blocked by the on and off governor valve; and Figure 8 is a view similar to Figure 7 wherein the regulated pressure is shown being delivered through the governor with the on and off valve open so that fluid pressure may enter the outlet line from the governor.

For ease of reference to the aforesaid prior co-pending application, the same reference characters will be used in this application to designate similar or identical parts.

Referring now to the drawings for a detailed description of the invention, and particularly to Fig. 1, there is disclosed a shaft 134 which may be the output shaft of an automotive power transmission so that it rotates in unison with the drive wheels of the vehicle in which the transmission is mounted. Splined to shaft 134 is a worm gear 288 which drives a worm wheel 290 connected through a flexible cable 292 to a speedometer or other device operated in timed relation with the driven shaft 134. Said shaft is suitably supported in a transmission housing 216 by means not shown. A casing 298 is mounted in housing 216 by means of studs 302, passing through openings in a flange 300, formed integrally with casing 298.

Rotatably mounted in casing 298 is a shaft 296 having a portion 295 of reduced diameter pinned to a gear 294, also driven from worm gear 288, so as to be rotatable in timed relation with shaft 134. Said rotatable shaft 296 has a passage 338 connected by a radial passage 336 to a port 332 which is connected to a suitable source of fluid under pressure, such as a pump or the like (not shown). The pressure of the fluid supplied from the pump is at a higher value than any pressure value desired in the outlet of the pressure regulating valve presently to be described. An outlet passage 354 is also formed in shaft 296 and communicates through a radial bore 356 to a port 357 of a suitable outlet passage (not shown) leading to the clutch or other device to be controlled by the regulator valve. The regulator valve itself is shown in outline at L in Fig. 1, and in detail in Figs. 2 and 3.

Referring now particularly to Figs. 2 and 3, casing 304 has a compound bore 310, 311 disposed with its axis normal to the axis of rotation of shaft 296 by which it is driven. Bore 311 is larger than bore 310. A piston valve having a weighted part 312 and a hollow part 342 is disposed in compound bore 310, 311 with weighted part 312 operating in bore 310 and the hollow part 342 being of larger diameter operating in larger bore 311. The step 316 formed at the outer end of part 342 constitutes a piston, the part of casing 304 adjacent the step being relieved in the form of a groove 344 into which fluid under pressure is conducted through an axial groove 340 in the outer periphery of the hollow part 342 communicating with inlet passage 338, whereby to urge said piston valve radially inwardly. Since the said piston valve is rotated with shaft 296, the fluid pressure on step 316 acts in opposition to centrifugal force.

If the valve as a whole were designed to produce moderate regulating forces at high speeds it would be too light and less positive at low speeds; it would be more susceptible to unwanted disturbances such as slight impurities in the fluid, shock, etc. According to this invention, this difficulty is avoided by the initial and substantially constant force mentioned below acting on the valve part 342 in addition to centrifugal force at all times, whether the valve is rotated or not. This substantially constant force is established by a spring 322 located in hollow part 342 and compressed between part 312 and an abutment 314 which is movable in bore 311 only for purposes of assembly but is otherwise fixed in said bore 311. The pressure of the fluid on step 316 cannot exceed the pressure of spring 322 when the valve is stationary; if it should exceed this pressure, valve part 342 would move radially inward in bore 311 until step 316 meets the inner shoulder of groove 344 to close off groove 340 from communication with groove 344, and thus, further pressure would be cut off. This means that valve part 342 will not produce a lower fluid pressure in groove 344 than the pressure of spring 322, and hence light, uncertain pressures are avoided. There will be some pressure in groove 344 as long as there is pressure in the inlet passage 338, and the pressure will vary as the square of the speed of the shaft 296, due to the action of centrifugal force on valve part 312, plus a constant equal to the spring pressure, thereby permitting the use of a relatively light valve while at the same time providing positive regulating action.

The abutment 314 is in the form of a sleeve retained in bore 311 by a snap ring 320. Fluid pressure behind, i. e. on the top of step 316 and transmitted through spring 322 holds the abutment against snap ring 320. Said abutment or sleeve 314 has a bore 348 which is connected by a passage 349 (Fig. 6) and a cross bore 351 in casing 304 to groove 344 so that the same pressure obtains in bore 348 as is found in groove 344. Within sleeve 314 is a valve plunger 324 having an annular groove 358 and a vent opening 360 in communication with a bore 362. Sleeve 314 also has a second bore 350 in communication with a radially disposed passage 352 connecting with outlet passage 354. A spring 330 abutting on sleeve 314 and acting against an enlarged end 331 on valve plunger 324 serves normally to align the edge of bore 362 with bore 350 and thus vents outlet passage 354. A relatively large weight 326 is mounted on plunger valve 324 and is held in place by a snap ring 328.

Upon rotation of shaft 296 and its valve L, centrifugal force will urge weight 326 outward against the force of spring 330. When the centrifugal force becomes greater than the restraining force of spring 330, weight 326 will move plunger valve 324 outward, thereby closing the vent bore 362. At a predetermined higher speed the annular groove 358 on plunger valve 324 will begin to communicate with bore 350, and fluid under pressure will be conducted to the outlet passage 354. The pressure of the fluid will vary in accordance with the operation of valve part 342 which, as stated above, creates a pressure varying as the square of the speed plus a constant.

In summary, valve part 342 regulates the pressure of the fluid to be applied to the clutch or brake operated thereby, and valve 324 determines when the fluid shall be made available in outlet passage 354. Referring to Fig. 7, the fluid enters the governor through passage 338 and flows past valve 342 into groove 340 to fill groove 344. The fluid pressure is then operative against step 316 as explained above to effect regulation of valve 342 and then the fluid flows out passage 351 into the horseshoe shaped passage 349 which conveys it to passage 348 formed in abutment or sleeve 314. As shown in Fig. 7, the position of valve plunger 324 serves to block off the flow of fluid in groove 358 of the valve plunger. However, when the valve plunger 324 has been moved out by reason of centrifugal action on weight 326 which is opposed by spring 330, the fluid flows from passage 348 through groove 358 into passage 350 formed in sleeve 314 from where the fluid flows onwardly through passage 352 to outlet passage 354. When the valve plunger occupies its innermost position such that the fluid flow is blocked off in groove 358, the cross bore 362 is lined up with the passage 350 as shown in Fig. 7, so that outlet passage 354 is connected to the vent 360 drilled in valve plunger 324.

It will be noted that since the outlet flow of fluid past valve part 342 must pass through valve plunger 324, the condition of the fluid in passage 354 will be the same as the condition of the plunger 324; if plunger 324 oscillates due to extreme sensitivity or other cause, the outlet pressure will likewise vary, despite the fact that valve part 342 is perfectly steady. It has been found in actual practice that plunger valve 324 will flutter under some conditions of operation, particularly if it is precisely constructed and operated in oil.

Referring now to Figs. 3, 4 and 5, wherein the modification made in plunger valve 324 in accordance with this invention to eliminate flutter in the said plunger is shown in detail, it will be seen to comprise simply a groove 359 milled into the side of plunger valve 324 and communicating with annular groove 358. This causes a hydraulic unbalance on the valve tending to push the plunger valve to the left as viewed in Fig. 3. The unbalance, in turn, increases the friction developed between the valve and the bore in which the valve operates and thereby increases resistance to the axial movement of the plunger. The size of the groove is calculated to provide just enough friction to eliminate the flutter without rendering the valve sluggish in operation. In one embodiment, a groove having the proportions of the one shown in Figs. 3, 4 and 5 caused a clutch engagement at a speed two miles per hour higher than the clutch disengagement, which is considered a satisfactory operation.

Thus the pressure regulator-governor combination described above provides positive action over a wide range of speeds due to the use of a spring in addition to centrifugal force at low speeds where a light mass is relatively insensitive, and also because of the slight hydraulic unbalance caused by groove 359 which prevents flutter of the governor plunger valve.

What is claimed is:

1. A speed responsive pressure regulator for fluids, said regulator comprising a rotatable member, a source of fluid under pressure connected to the rotatable member, means having a normally open passage therein for reducing the fluid pressure from said source to a value which varies as the square of the speed of rotation of the member plus a constant, and additional speed responsive means for making the regulated fluid pressure available only after a predetermined speed of rotation of the rotatable member has been attained.

2. A speed responsive pressure regulator for fluids, said regulator comprising a rotatable member, a source of fluid under pressure connected to the rotatable member, a speed responsive valve driven by the rotatable member, said member having an outlet passage leading from the valve, means for causing the fluid under pressure to act upon the valve in opposition to centrifugal force, said fluid pressure changing in value as the centrifugal force changes, means for impressing a substantially constant force on the valve in the same direction as the centrifugal force such that the fluid pressure acting in opposition to centrifugal force acts also in opposition to the constant force, thereby maintaining in the outlet passage a predetermined minimum pressure value irrespective of the value of the said centrifugal force, and additional speed responsive means in the outlet passage leading from the valve for making the regulated fluid pressure available only after a predetermined speed of rotation of the rotatable member has been attained.

3. A speed responsive pressure regulator as described in claim 2, said means for making the regulated fluid pressure available at a predetermined speed of rotation of the rotatable member comprising a valve rotatable with the said member and movable relative to the member in response to centrifugal force, and resilient means acting on the last-mentioned valve in opposition to the centrifugal force.

4. A speed responsive pressure regulator as described in claim 2, said means for making the regulated fluid pressure available at a predetermined speed of rotation of the rotatable member comprising a valve rotatable with the said member and movable relative to the member in response to centrifugal force, resilient means acting on the last-mentioned valve in opposition to said centrifugal force, and means for frictionally damping the movement of the last-mentioned valve.

5. A speed responsive pressure regulator as described in claim 2, said means for making the regulated fluid pressure available at a predetermined speed of rotation of the rotatable member comprising a piston valve rotatable with the said member and movable relative to the said member in response to centrifugal force, said piston valve having a groove at one side thereof in communication with the regulated fluid pressure, whereby to impose a side thrust on said valve which creates a frictional damping on the movement of said piston valve.

6. A speed responsive pressure regulator for fluids, said regulator comprising a rotatable member having a radially disposed bore, a weighted pressure regulating valve in said bore, said valve being influenced by centrifugal force, means for establishing a minimum value of centrifugal force below which the valve remains inoperative in response to centrifugal force, a second centrifugally responsive weighted valve in said bore, said rotatable member having a fluid inlet passage connected to the weighted pressure regulating valve, a passage connecting the output of the pressure regulating valve to the input of the second weighted valve, and a fluid outlet passage connected to the output of the second weighted valve; and resilient means for biasing said second valve toward its closed position but which permits the second weighted valve to open at a predetermined speed of rotation of the rotatable member.

7. A speed responsive pressure regulator for fluids, said regulator comprising a rotatable member, a source of fluid under pressure connected to the rotatable member, means having a normally open passageway for reducing the fluid pressure from said source to a value which varies as the square of the speed of rotation of the member plus a constant, said reducing means having an input to receive said fluid and an output for the delivery of fluid of reduced pressure, a valve having a movable element for shutting off or permitting the flow of fluid through the output of the fluid pressure reducing means, means for moving said element to open said output controlling valve when said rotatable member attains a predetermined speed of rotation, and means for frictionally damping the movement of said movable element of the output controlling valve.

8. A speed responsive pressure regulator for fluids, said regulator comprising a rotatable member, a source of fluid under pressure connected to the rotatable member, said rotatable member having aligned radially disposed connected bores of different diameters, a valve having portions of different diameter to form a step therebetween, one portion being disposed in each bore, means for conducting fluid under pressure to the step to urge the valve in the direction of the larger bore, said step cooperating with certain of said radial bores to form an orifice which is progressively restricted as the valve moves in the direction of the larger bore, resilient means opposing the movement of the valve toward the larger bore, whereby to establish a minimum fluid pressure at the step, means movable as a function of the speed of rotation of the member for opposing the movement of the valve in the direction of the larger bore whereby to develop a fluid pressure at the step which varies as the square of the speed of rotation of the member plus a constant, an outlet passage for the fluid at the step, and normally closed valve means responsive to the speed of rotation of the member for opening the outlet passage when the rotatable member attains a predetermined speed of rotation.

9. A speed responsive pressure regulator as described in claim 8, and means for frictionally damping the movement of the valve means for controlling the said outlet passage.

10. A speed responsive pressure regulator for fluids, said regulator comprising a source of fluid under pressure, a rotatable member having two bores disposed therein in radial alignment, the radially inner bore being of greater diameter than the other of said two aligned radially disposed bores, a relatively wide circumferentially disposed groove in said rotatable member at the juncture of the two bores, a valve in the greater diameter bore having a circumferentially disposed groove in its outer wall surface in communication with the source of fluid under pressure, said last named grooves being disposed near the outer end of said valve so as to leave a thin wall between the valve groove and the remainder of the outer end of the valve, said remainder including a generally cylindrical mass connected to the valve and disposed in the radially disposed smaller outer bore, said mass generating a centrifugal force which acts to move the connected valve radially outward, said relatively thin wall being disposed to move across said relatively wide groove as said valve moves outwardly, spring means normally acting to urge the valve radially outward, said groove in the valve being progressively brought into overlapping relationship with said relatively wide groove at the juncture of the two bores as the valve moves outward to admit fluid under pressure to said relatively wide groove, both sides of said thin wall being exposed to the fluid in the last-mentioned groove such that fluid pressure in the groove tends to push the valve radially inward and thus in a direction to drive the grooves out of overlapping relationship, a hollow sleeve in the larger diameter bore, said sleeve being bored radially and axially with respect to the axis of the rotatable member, a plunger valve in the radial bore of said sleeve, said rotatable member having a flow passage therein for delivering the pressure fluid in the relatively wide groove at the juncture of the two bores to the axial bore in said sleeve, a circumferential groove on the surface of the plunger valve, an outlet opening in the sleeve, said plunger valve being adapted to move in the sleeve to cause an overlapping of the groove in the plunger valve with the outlet opening to effect delivery of pressure fluid from the groove to the outlet opening, and means associated with said rotatable member responsive to centrifugal force for moving the plunger valve under certain conditions to effect the overlapping of the groove in the plunger valve with the axial bore and the outlet opening.

11. A speed responsive pressure regulator as described in claim 10, said plunger valve having an axial groove on one side thereof in communication with the circumferential groove in the plunger valve, whereby fluid pressure in said circumferential groove in the plunger valve passes to the said axial groove and creates a side thrust on the plunger valve, whereby to provide frictional damping for the plunger valve.

References Cited in the file of this patent

UNITED STATES PATENTS

| Number | Name | Date |
|---|---|---|
| 1,292,346 | Martyn | Jan. 21, 1919 |
| 2,105,473 | Dean | Jan. 18, 1938 |
| 2,163,203 | Kegresse | June 20, 1939 |
| 2,578,676 | Dean | Dec. 18, 1951 |